United States Patent

[11] 3,586,271

| [72] | Inventor | Jerome James Sloyan<br>c/o Automatic Motor Base Co., Windsor, N.J. 08561 |
|---|---|---|
| [21] | Appl. No. | 821,653 |
| [22] | Filed | May 5, 1969 |
| [45] | Patented | June 22, 1971 |

[54] MOTOR SUPPORT WITH SPRING BALANCING CONTRA TO MOTOR WEIGHT
9 Claims, 13 Drawing Figs.

| [52] | U.S. Cl. | 248/13, 74/242.15, 248/292 |
|---|---|---|
| [51] | Int. Cl. | F16m 1/00 |
| [50] | Field of Search | 248/16, 23, 13, 291, 293, 292, 376, 377, 384, 372; 74/242.15, 230.17, 242.13 |

[56] References Cited
UNITED STATES PATENTS

| 1,824,822 | 9/1931 | Kradolfer | 248/16 |
| 2,543,967 | 3/1951 | Heyer | 74/230.17 |
| 2,624,535 | 1/1953 | Bollhoefer | 248/23 |
| 2,721,049 | 10/1955 | Waldsmith | 248/23 |

*Primary Examiner*—J. Franklin Foss
*Attorney*—Howard P. King

ABSTRACT: A motor support comprising an open cratelike frame the bottom of which defines a basal plane and adapted there to be fixed to an available surface. To this fixed frame is hinged a movable frame member on which a motor may be mounted, the motor having a spring-loaded variable-pitch pulley located in a plane passing said frames at a side thereof whereby belt drive may be used to a machine situated selectively above or below said frames and motor, or in other words, offset from said basal plane. Longitudinally within the fixed frame is a screw shaft engaging through a yoke or rider at the ends of which are swinging struts having upper connection to the movable frame for rising and lowering the same. Springs are provided for said yoke to compensate for the weight of the motor.

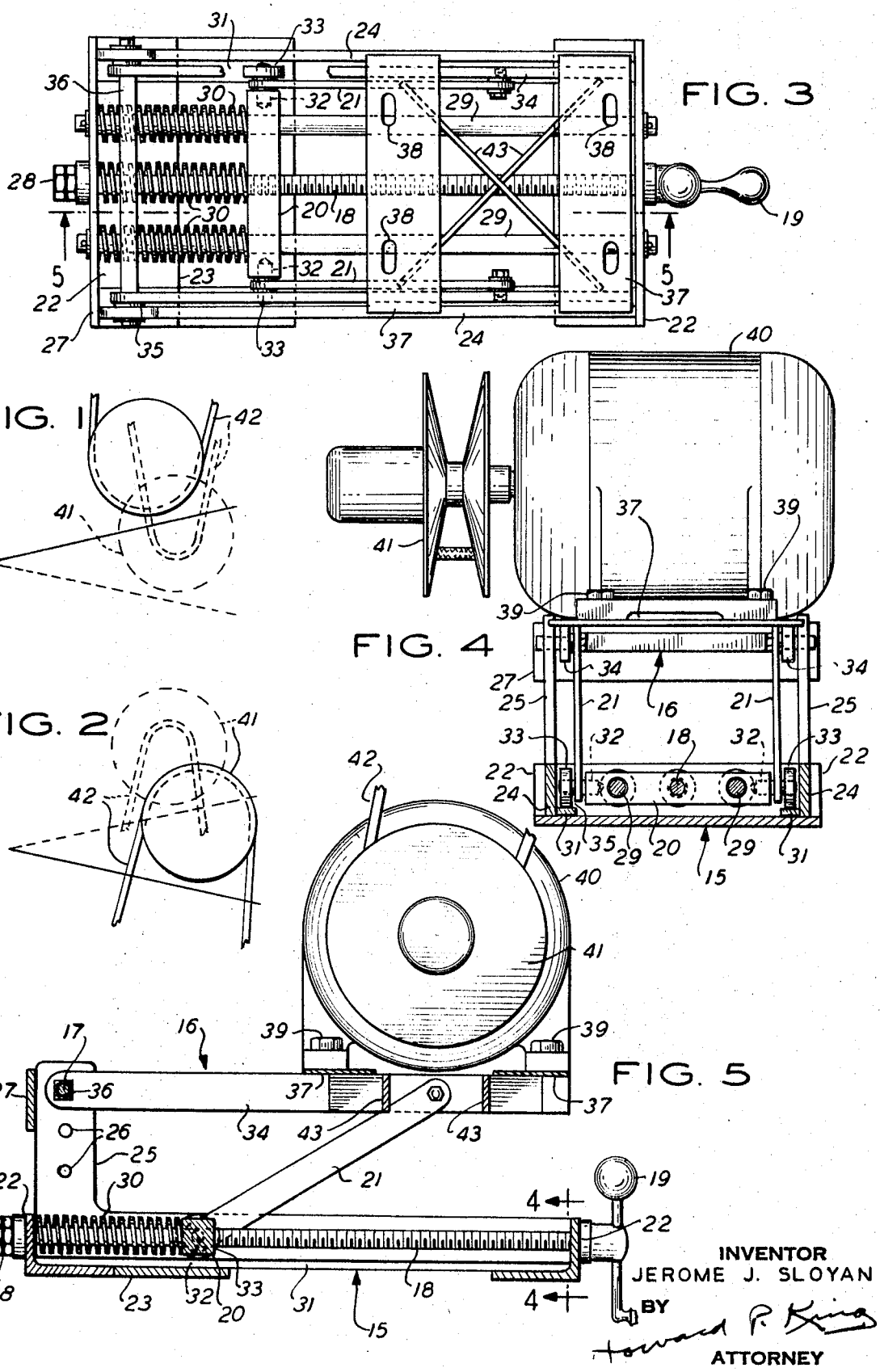

INVENTOR
JEROME J. SLOYAN

BY Howard R. King
ATTORNEY

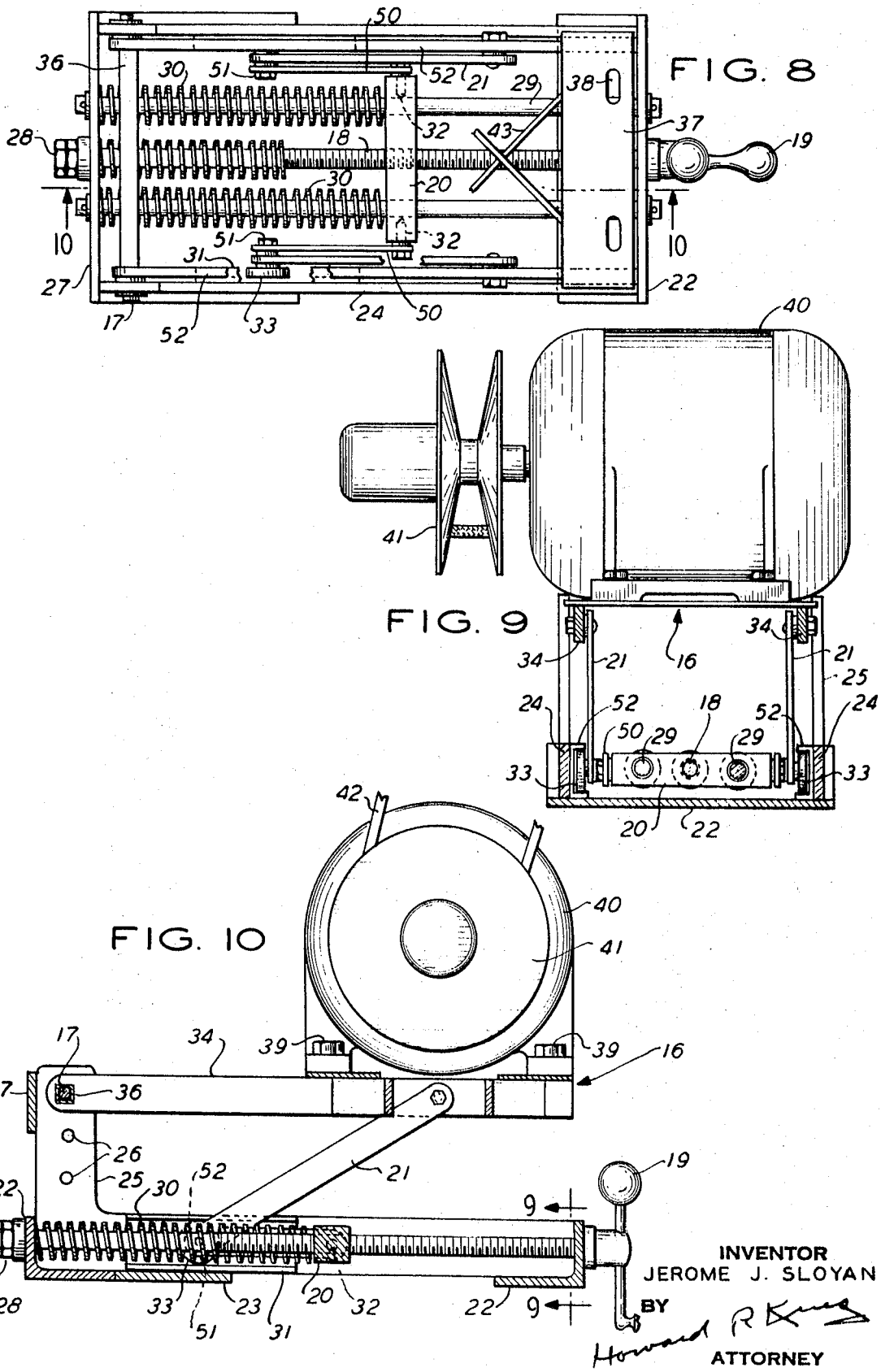

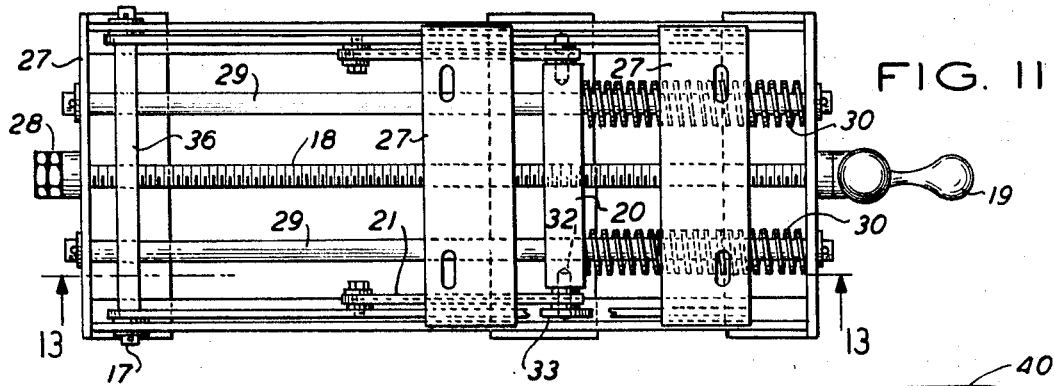
FIG. 11
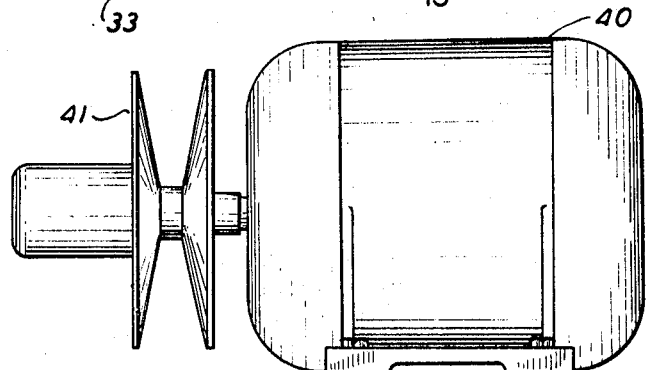
FIG. 12
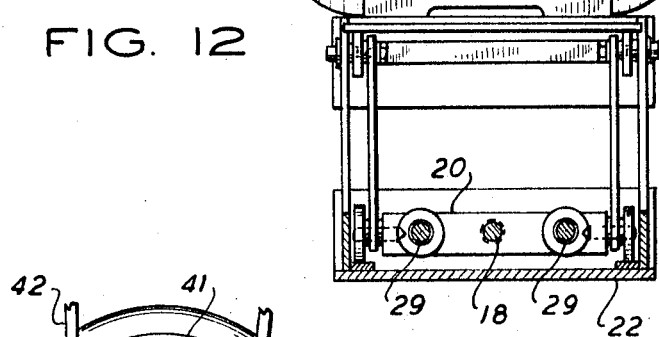
FIG. 13
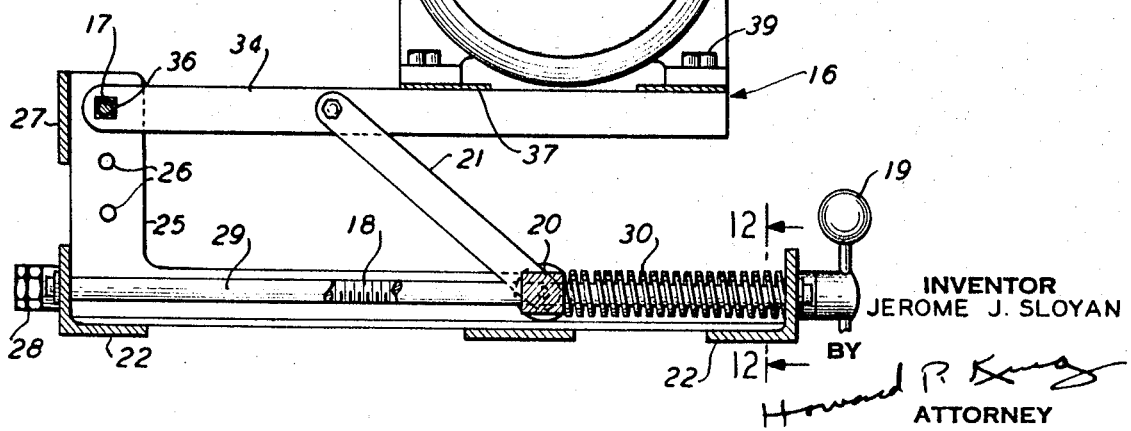
INVENTOR
JEROME J. SLOYAN
BY
Howard R. Berg
ATTORNEY

MOTOR SUPPORT WITH SPRING BALANCING CONTRA TO MOTOR WEIGHT

GENERAL CONSIDERATIONS

The device of the present invention is a base for mounting a motor, and primarily a motor equipped with a spring-loaded variable-pitch driving pulley much used in industry. There are on the market many bases intended for this generally stated use. For the most part, however, the prior art bases involve use of a sliding carriage reciprocatively mounted on parallel rails so that the carriage moves in a plane parallel to the basal plane on which the base is fixed. Such bases are consequently limited in use to situations wherein the axis of the driven pulley is approximately at the same level as the axis of the driving pulley and at most never more than 45° above or below that level.

In applications where the above-mentioned sliding carriage type of base is forced into service in situations, for instance, involving a driven pulley located directly above or below the driving pulley, the base must be vertically mounted, and as this rarely occurs close to a sidewall, some other suitable facility for mounting has to be arranged or devised, such as angles, brackets, and other makeshifts, suitable to the occasions.

Under this broad heading of general considerations, it would appear timely to become specific in respect to hinged constructions and to state that the line of hinging of the movable member has to be a considerable distance laterally from a line intersecting both pulley axes so as to provide a movement of the axis of the driving pulley commensurate with the desired diametric variation of position of the belt in that pulley. Under usual circumstances, the movement should be a minimum of at least two-thirds of the driving pulley diameter. This necessitates that the hinging must be offset well beyond the side of the motor.

THE DRAWINGS

FIGS. 1 and 2 are diagrammatic side views showing belt approach to the movably supported motor from above and below respectively;

FIG. 3 is a plan view of a motor base in accordance with the invention, but without a motor thereon;

FIG. 4 is an elevational cross section on line 4–4 of FIG. 5;

Figure 6:
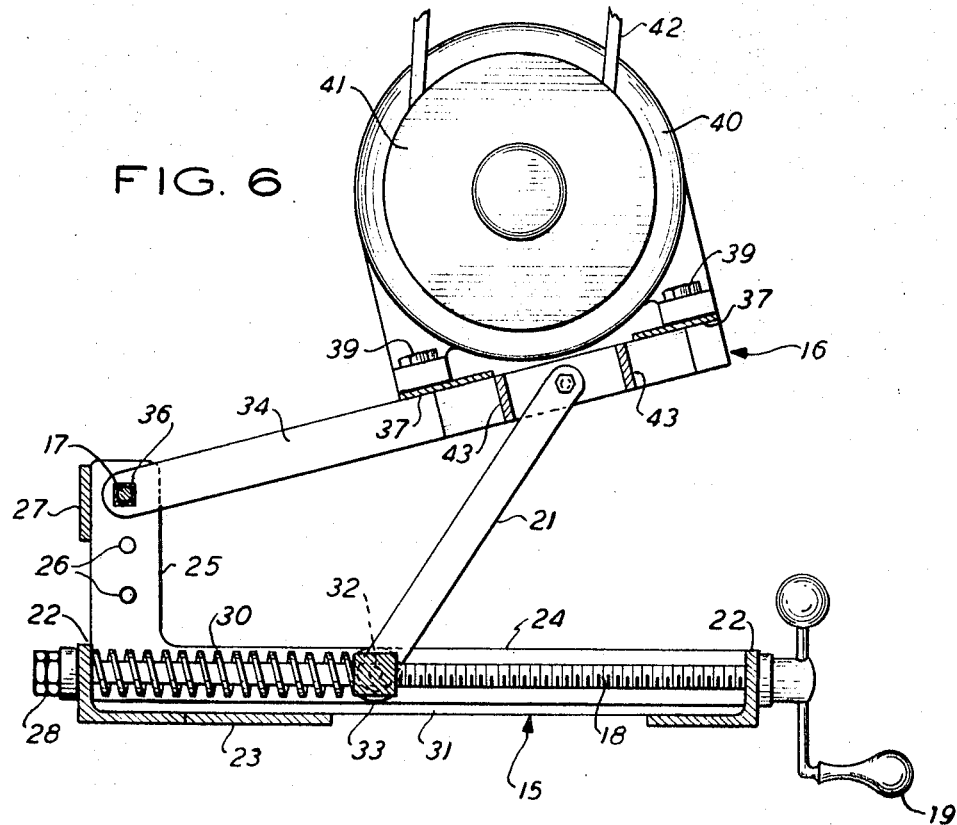
Figure 7:
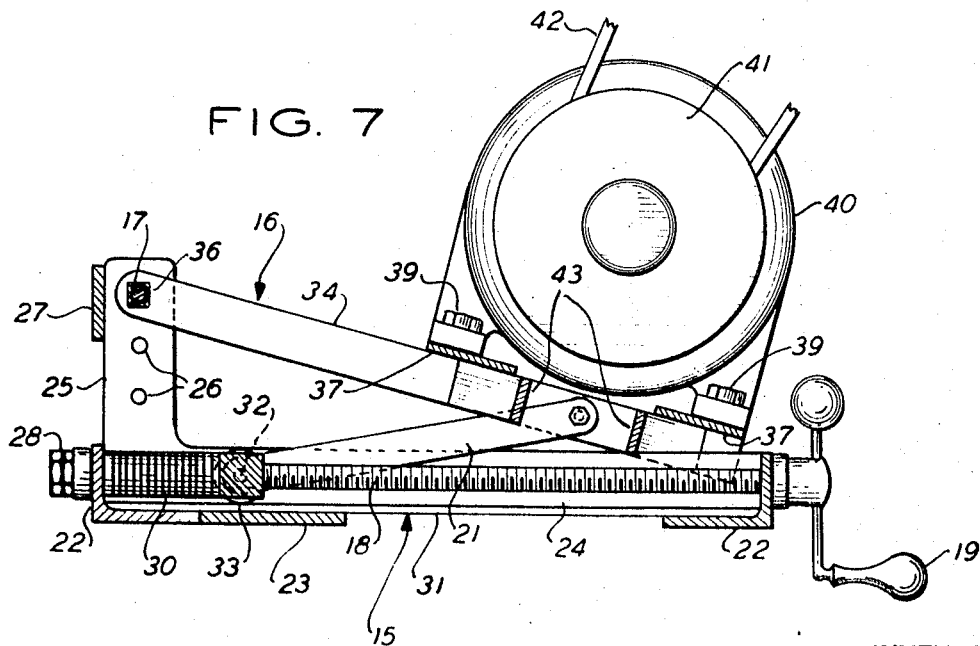

5 is a longitudinal sectional elevation on line 5–5 of FIG. 2 with the movable member and motor at a medial position;

FIGS. 6 and 7 are views similar to FIG. 5 showing the movable member and motor in upwardly and downwardly tilted positions respectively;

FIG. 8 is a plan view similar to FIG. 3 but showing a modified construction;

FIG. 9 is a cross-sectional view thereon on line 9–9 of FIG. 10;

FIG. 10 is a longitudinal sectional view on line 10–10 of FIG. 8;

FIG. 11 is a plan view of another modified construction;

FIG. 12 is a cross-sectional view thereon on line 12–12 of FIG. 13; and

FIG. 13 is a longitudinal sectional elevation on line 13–13 of FIG. 11.

DESCRIPTION

Directing attention initially to FIGS. 1—5, reference numeral 15 designates in general what will be termed a fixed member of open frame or cratelike character, to which is hinged a movable member 16 by a transversely located hinge pin 17. Control mechanism is provided for swinging said movable member and retaining it in the established position. No attempt has been made to include a showing of the control mechanism in FIGS. 1 and 2, but in FIGS. 3—5, it will be seen as comprising primarily a screw shaft 18 longitudinally retained in the fixed member and rotatable by a crank 19 and passing with threaded engagement through a slidable yoke or rider 20 having connection by struts 21 to incline and prop the movable member by shifting the yoke, or rider 20.

Somewhat more in detail, the fixed member 15 as shown by the present disclosure is a welded metallic structure transversely at the ends whereon are parallel angle iron headers 22 bottom flanges of which are in a common basal plane of equal length to said headers and forwardly from the bottom flange of what will be termed the rear header is an extension 23, likewise welded in place.

Proximate to the opposite ends of said extension and to the corresponding ends of the headers, welded thereto, are side rails 24 which are parallel to each other and in planes perpendicular to said basal plane. At the rear ends of said side rails 24, projecting perpendicularly upwardly therefrom and from the rear header is an upright leg 25. Said upright legs have a plurality of axially aligned holes 26 for selectively receiving aforementioned hinge pin 17. Said upright legs 25 are conveniently held in spaced relation by a cross brace 27 welded thereto and in the plane of and in parallelism to the upright flange of the rear header.

The above-described screw shaft 18 is located medially between and parallel to said side rails 24 with its ends projecting through the upright flanges of the angle iron headers 22. Jam nuts 28 are fixed on the rear end of the screw where protruding through the said rear header whereas said crank 19 is secured to the front end of said screw shaft in front of the upright flange of the front header thereby retaining the screw shaft from longitudinal displacement but permitting rotation of the screw under actuation by said crank. Between each side rail 24 and the screw shaft, parallel thereto is a guide rod 29 the opposite ends of each whereof are secured in the upright flanges of both headers 22.

Previously mentioned yoke 20 slidably receives said rods 29 there through whereas the screw shaft 18 is threaded therethrough. On each rod and on said screw shaft is a compression coil spring 30, one end of each of which is retained from displacement by engagement against the upright flange of the rear header. The forward ends of the springs bear against the yoke 20. It may be here mentioned that maximum force of the springs is exerted when the yoke is at its nearest location to the rear header.

At the inwardly facing side of each rail, 24, next to the lower longitudinal edge thereof, and integral therewith, is a shelflike track 31. Studs or pins 32 protrude from the ends of yoke or rider 20 substantially as far as the rails 24 so as to extend over the track and function there at as axles for rollers 33 which provide constant trolley support for the yoke in its transit forwardly and rearwardly of the fixed member 15. Said studs or pins 32 also pass through and function as pivots for the rearward ends of previously mentioned struts 21 located between the ends of the yoke or rider 20 and the respective roller 33 thereat.

Movable member 16 provides side stringers 34 of approximately the same length as the side rails 24 of the fixed member. These side stringers 34 are in parallel planes somewhat closer together than the planes of the side rails 24 of the fixed member so as to project at their rear ends between the upright legs 25 of said side rails with clearance space for washers 35. Aforementioned hinge pin 17 extends through the rear end portions of said stringers 34 and through said washers 35, and into said side rails 24 thereby hingedly mounting the movable member 16 to the fixed member 15. The stringers 34 are retained at constant distance apart by a spacer tube 36 located on the hinge pin 17.

Forwardly of the stringers 34 transverse thereto and welded on the top edges thereof, are appropriately spaced plates 37 shown with slots 38 through which bolts 39 may be applied for securing a motor 40 upon the movable member 16, said motor having on its rotative axis, a spring-loaded variable-pitch pulley 41 in a plane beyond the side of the fixed member 15, so that, as occasion may require, a belt 52 on said pulley may extend to a driven pulley (not shown) located at a level below said fixed member. For additional rigidity, a crisscross or X- shaped brace 43 may be welded to the side stringers 34 in a position there between and beneath the motor-carrying plates 37.

It will now be recognized that the movable member 16 can be swung to and maintained at any one of numerous positions. As illustrated in FIG. 5, the movable member 16 is at what may be considered a midposition; in FIG. 6 in an upper or elevated position; and in FIG. 7 in a lower or depressed position.

It is essential that the axis of the spring-loaded variable-pitch pulley 41 be allowed lateral displacement toward and from the machine to be driven, to permit the belt 42 to engage said pulley selectively at its greatest diameter or at a diameter approximately one-third of the greatest diameter in order that a ratio of 3 to 1 can be obtained by the fixed pulley (not shown) which has a fixed diameter. Thus, it is that the members 15 and 16 with hinging 17 remote from and laterally offset from the motor, motor axis and belt, permit a selective raising and lowering of the entire motor by appropriate manipulation of the crank 19 for rotation of the screw shaft 18 with consequent shifting of yoke or rider 20 and actuation of struts 21 controlling position of angularity of the movable member 16 to fixed member 15. In that said screw shaft 18 in the present showing is provided with a conventional right-hand thread, so clockwise rotation of crank 19 will cause yoke or rider 20 to move toward the crank at the front end of the fixed member 15 and produces a lifting moment for the hinged movable member 16. Likewise counterclockwise rotation of the crank results in a retractive movement of the yoke and a lowering of the movable member.

Now it is to be observed that leverage or mechanical advantage effective for moving the yoke or rider 20 supplied by struts 21 in position of near parallelism to the movable member 16, as prevails in FIG. 7, is much less effective than with the struts more nearly perpendicular, as in FIG. 6. The aforementioned springs 30 compensate for the difference in leverage or mechanical advantage to equalize the turning force or torque necessary to be applied to the crank. When the leverage is least, the springs are under maximum compression and as the leverage increases, the springs correspondingly expand and apply less and less lifting moment. Of course, springs of suitable capacity, length and increment constant are provided so that throughout rotation of the screw shaft, regardless of the elevation of the movable member, the torque on the screw threads will remain as nearly uniform as possible, the torque being reflected in the force necessary to rotate the crank 19. The nature of the application in any particular circumstances of use will determine the requisite spring characteristics and how many springs should be used. It will therefore be recognized that in both FIGS. 1 and 2, the purpose, of the springs is to effect a smoothing out of the force which must be applied to the crank in its contribution to movement of the yoke in its control of the raising and lowering of the motor throughout movement from one extreme position to the other. This control also includes consideration of whether or not the belt has to be moved toward the center of the pulley.

In FIG. 1, swinging of the movable member from the upper solid line position to the lower dotted line position, involves a simultaneous forceful expansion of the variable pitch pulley, the power for doing which has to be supplied which in this instance is accomplished by utilization of gravitational force developed by the motor. In making this assembly, therefore, springs 30 will be incorporated of sufficient compensating force for the weight of the motor, to leave adequate prevailing weight for the pulley expansion requirement, without reflecting any material burden in use of the crank. On the other hand, in FIG. 2, forceful expansion of the variable pitch pulley occurs in the upswing of the movable member from solid line to dotted line position. Consequently, the force needed to expand the pulley is in addition to force needed to overcome gravity in lifting the motor. It therefore follows that springs 30 of correspondingly greater compressive strength are used for this type of installation. In either mode of use, the power which the operator has to apply to the crank is both small and very nearly uniform throughout the complete swing of the movable member and for forces so nearly balanced that only a short-leverage crank is required.

Conditions in either instance of FIG. 1 or FIG. 2 may require the use of larger springs 30 than can be normally accommodated between yoke 20 and the header 22 where the struts 21 are in the raised position of the movable member 16 as in FIG. 6. The modified construction shown in FIGS. 8, 9 and 10 covers this situation.

The movable member 16 of FIG. 8, 9 and 10 is identical with the movable member above described and the same reference numerals are applied thereto without repetition of the description. To a considerable extent, the fixed member in both constructions are closely similar as will be recognized from reuse of reference numerals on like parts.

Primarily, the difference in the two constructions resides in location of yoke or rider 20 further forward in the modified showing and instead of pivoting the rear ends of the struts 21 directly to the yoke, an intervening link 50 at each end of the yoke is pivoted thereto, said links extending rearwardly and having pivot connection 51 at their rear ends to the rear or bottom ends of the struts 21. In this instance the rollers 33 are mounted on this link-strut pivot 51 and, as previously described, ride on tracks 31. In this instance, it is desirable to also provide downwardly facing upper tracks 52 overlying the rollers to keep them from jumping up. Since the links 50 are at all times parallel to the guide rods 29 exerting little, if any, thrust transverse to the basal plane, rollers on the ends of the yoke can be dispensed with thereat, it sufficing to have them only at the bottom ends of the struts in each form of the invention. It will also be observed, that since the yoke is located further forwardly in the presently described modified construction, the springs 30 may be longer and function over a longer range of movement of the yoke.

While the foregoing description, in the interest of being definite and complete, has been specific, in many respects to the exact construction illustrated, the invention is not to be construed as confined thereto. For instance, the foregoing showing has located the springs 30 as between the yoke and rear header, with the struts consequently sloping forwardly from the yoke to the movable member. But this situation may be reversed, as shown in FIG. 11, 12 and 13, wherein said springs are located between the front header and the yoke, and the struts slope upwardly rearwardly. Otherwise the construction, description and reference numbers set forth above for FIGS. 1 to 10 apply to the modified showing of FIG. 11 to 13 inclusive. In any event, the length, capacity and increment constant of springs employed are chosen to fulfill the requirements of the particular installation and use of the motor base with the net result that the operating force necessary to be applied to the crank 19 is conveniently small and is substantially uniform for all positions to which the movable member 16 is swung.

I claim:

1. A motor support comprising a relatively fixed member adapted to be located in a horizontal position and a movable member substantially longitudinally extensive therewith and occupying a position thereabove, said members being hinged together proximate to one longitudinal end of each, and the movable member having means at the longitudinal end portion thereof remote from the hinged end for receiving and holding a motor thereon a rotatable screw shaft located at a level below said hinging of said members and mounted in and parallel to and extending from end to end of said fixed member and retained therein from longitudinal displacement, a yoke transverse to and receiving said screw shaft therethrough and in threaded engagement therewith, and struts always having upward slope from said yoke to the movable member, said struts being "operatively connected" at their lower ends with said yoke and at their upper ends with said movable member for swinging said movable member on its hinges by rotation of said screw shaft and consequent transition of said yoke and struts connected therewith.

2. A motor support in accordance with claim 1 wherein a spring axially parallel to said screw shaft and in direct engagement with said yoke is provided tending to actuate said yoke in a direction contra to the force imposed on said yoke by the weight of the motor.

3. A motor support in accordance with claim 2, wherein said spring is proximate to the end of the fixed member where the movable member is hinged.

4. A motor support in accordance with claim 2, wherein said spring is at the opposite end of said fixed member from where the movable member is hinged.

5. A motor support in accordance with claim 2, wherein a plurality of springs are provided arranged parallel to and disposed on opposite sides of said screw shaft.

6. A motor support in accordance with claim 5, wherein fixed rods are provided for support of said springs at opposite sides of said screw shaft, said rods passing through said yoke and said yoke being slidable on said rods.

7. A motor support in accordance with claim 6, wherein said springs are proximate to the end of the fixed member nearest which the movable member is hinged.

8. A motor support in accordance with claim 7, wherein said springs are at a level below the level of said hinging and thereby offset therefrom, and wherein said springs are proximate to the end of the fixed member remote from the hinging of said members.

9. A motor support in accordance with claim 7, wherein said springs are at the opposite end of said fixed member from where the movable member is hinged.